Dec. 4, 1962   G. R. BETZHOLD ETAL   3,067,081
PROCESS FOR SILICONE RUBBER COIL INSULATION
Filed Nov. 19, 1959
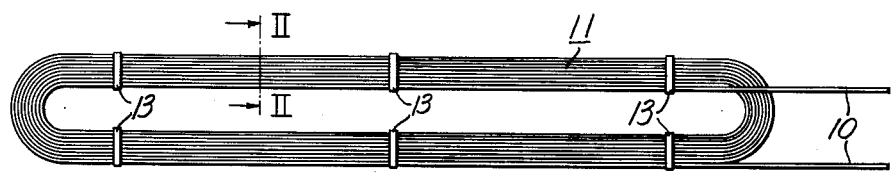
Fig. 1
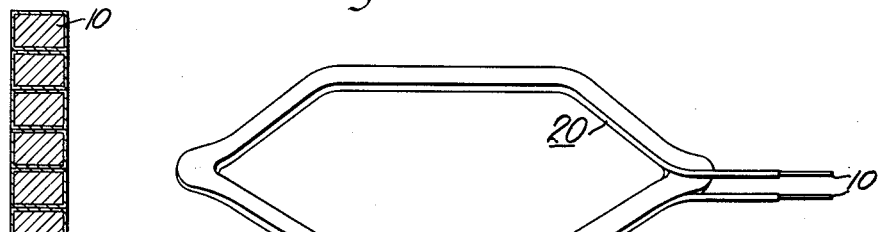
Fig. 2
Fig. 3
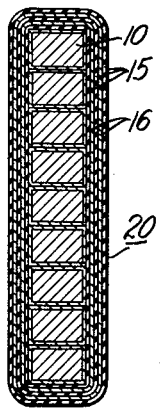
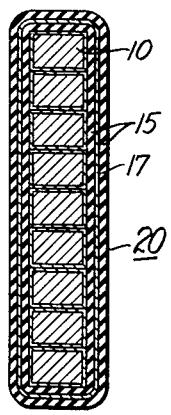
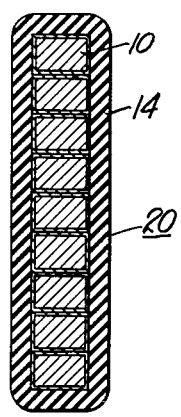
Fig. 5   Fig. 6   Fig. 4
Inventors
George R. Betzhold
Robert J. Conrad
By Fabian A. Brusk
Attorney

United States Patent Office 3,067,081
Patented Dec. 4, 1962

3,067,081
PROCESS FOR SILICONE RUBBER COIL INSULATION
George R. Betzhold, Milwaukee, and Robert J. Conrad, Pewaukee, Wis., assignors to Allis-Chalmers Manufacturing Company, Milwaukee, Wis.
Filed Nov. 19, 1959, Ser. No. 854,142
9 Claims. (Cl. 156—56)

This invention relates to a method of coating articles with silicone rubber. More particularly, this invention relates to a method of coating articles with silicone rubber utilizing a silicone rubber dispersion.

The discovery of silicone rubber and its unusual properties caused the electrical industry to investigate its application for electrical insulation. The early use of silicone rubber as insulating material utilized supported and unsupported tape or sheet material and wrapped the conductor with successive layers of the tape or sheet in order to build up a unitary wall thickness having a desired dielectric strength. In another manner, an insulating wall having a relatively high dielectric strength can be formed by encapsulating an article with silicone rubber.

It is well known that multiple coats of a natural rubber solution may be applied to an article to provide a unitary rubber coating having a desired thickness. However, the direct substitution of commercially available silicone rubber elastic gum dispersion for the natural rubber coating solutions in the prior art natural rubber coating method appeared to limit the coating method for silicone rubber elastic gum to a single application. Additional coatings of the silicone rubber elastic gum failed to vulcanize when subjected to vulcanizing conditions.

According to this invention, a plurality of coats of silicone rubber elastic gum may be successfully applied on an article. In brief, this invention describes a method for dip applying a plurality of layers or coats of silicone rubber elastic gum dispersion to a conductor. The conductor is dipped into a silicone rubber elastic gum dispersion and permitted to drain in any conventional manner. After each step of dipping and draining, the freshly deposited layer of silicone rubber is subjected to a step of dispelling the solvent that may remain absorbed in the rubber.

The dispelling step is performed at a temperature substantially below the temperature above which the vulcanizing agent causes the silicone rubber elastic gum to be converted to the infusible stage. The prior art teaches that utilization of a rubber dispersion to coat articles required some vulcanization of each application of rubber if additional coats are to be applied. Thus, between each coat of rubber, a vulcanization step is required. Applicant discovered some vulcanization between dip coats is not required when silicone rubber elastic gum is utilized. Applicant therefore eliminated a time and fuel consuming step heretofore considered essential in the process of coating articles with rubber.

Additional coats of silicone rubber may be applied according to the foregoing steps, and after the final coat is applied, the coated conductor is subjected to vulcanizing conditions.

An object of this invention is to provide a new and improved method of applying a plurality of silicone rubber elastic gum coats to articles.

Another object of this invention is to provide a new and improved method of insulating an electrical conductor with silicone rubber to provide a substantially homogeneous and void-free insulation.

Another object of this invention is to provide a new and improved method of applying a plurality of dipped silicone rubber coats to an electrical conductor to build up a uniform insulating layer having a desired dielectric strength.

Other objects and advantages will be apparent from the following description.

For a better understanding of the nature and objects of the invention, reference should be had to the following detailed description and drawing in which:

FIG. 1 is a view in elevation showing a plurality of metal strap turns ready to be coated;

FIG. 2 is an enlarged view cross section of FIG. 1 at II—II;

FIG. 3 is a view in elevation of a completed conductor coated according to this invention;

FIG. 4 is an enlarged cross section view of a conductor prepared according to one species of the invention;

FIG. 5 is an enlarged cross section view of a conductor prepared according to a second species of the invention; and FIG. 6 is an enlarged cross section view of a conductor prepared according to a third species of the invention.

As shown in FIG. 1, a metal strap 10 is wound to form a conductor comprising a plurality of turns 11. The metal strap 10 may comprise any suitable flexible electrical conductor, for example, copper wire, copper strap or braided copper. Other electrical conductor metals such as silver, aluminum and steel may also be employed. The metal strap 10 is generally lightly insulated with any of the usual types of inorganic insulation. It is preferred to have a metal strap covered with a material that provides excellent adhering properties for the silicone rubber, such as a glass and Dacron filament coated copper conductor that is available commercially. One example of such a material is the product of Philips-Dodge and is known by its trade name "Daglas."

Generally, the conductor comprises a plurality of turns "and is provided with means such as clips 13 to hold the turns" in a stacked arrangement during the first coating cycle. The clips 13 are removed after the first coating cycle.

According to this invention, a conductor comprising a large strap (not shown) or a plurality of strap turns 11 (formed or uniformed), is coated with a dispersion of silicone rubber. The coated conductor is then subjected to a step of dispelling substantially all traces of solvent. The term "substantially all" means that any remaining solvent, if any, is negligible and will not prevent vulcanization. These steps are repeated until the conductor has deposited thereon an insulating layer of silicone rubber having a desired dielectric strength. The coated conductor is then subjected to a step of vulcanization.

The term "vulcanization" as used herein denotes the step of applying heat to activate the vulcanizating agent and cause the silicone rubber elastic gum (organopolysiloxane) to rapidly polymerize from its plastic state to a solid elastic homogeneous product.

The method outlined above may be modified to increase the rate of build-up of the insulating wall and/or to improve the structural strength of the insulating wall. To increase the build-up rate of the outer wall the conductor may, between the coating cycles, be wrapped with a silicone rubber tape. To increase the structural strength of the insulating wall, as would be desired whenever a high dielectric strength necessitated a large number of coats, at least one wrapping of loosely woven temperature resistant material, such as a porous polyester mat tape or a woven glass tape, is applied between the coats. It is equally possible to combine the steps in any manner desired. However, in the modified processes, it is preferred that the conductor is in its final configuration prior to the application of the first coat.

In insulating electrical conductors in accordance with our invention, a dispersion is employed comprising fusible silicone rubber elastic gum, a filler, a volatile solvent, and a vulcanizing agent soluble in the solvent added to equal approximately twenty times the amount of vulcanizing agent normally necessary to vulcanize a single coating of silicone rubber dispersion. This dispersion is applied by dipping the conductor into the dispersion.

It is well known that silicone rubber has a strong affinity for organic solvents and that the vulcanizing agents normally utilized are highly soluble in organic solvents. Therefore, when applying an additional cost of silicone rubber dispersion to an already coated article, the previously deposited solvent-free silicone rubber coat readily absorbs a large amount of the solvent present in the freshly applied coat. The vulcanizing agent, being highly soluble in the solvent, is absorbed with the solvent, leaving only a small amount of vulcanizing agent remaining in the newly deposited coat. Thus, to insure that sufficient vulcanizing agent will be present in the newly deposited layer, it was found that adding approximately twenty times the amount of vulcanizing agent normally required to vulcanize a single coating insured having ample vulcanizing agent present in each of a plurality of dip coats.

The base stock for a coating dispersion of this character is commercially available under the following trade names: K–1014S or K–1605RS from the Union Carbide Chemical Company; 6538 Dispersion or 6536 Dispersion from the Dow Corning Corporation; or SE–100S from the General Electric Company. The aforementioned solutions are equally suitable for use in this invention and are commercially available with or without the addition of a normal amount of vulcanizing agent.

In order that those skilled in the art may better understand how the present invention may be practiced, the following examples are given by way of illustration and not by way of limitation. In the following examples, a silicone rubber dispersion is utilized having the following product specifications: between twenty to thirty weight percent silicone rubber solids (includes various inert fillers added to silicone rubber elastic gum) dispersed in a volatile organic solvent, such as toluene or xylol, and a vulcanizing agent, such as crystalline benzoyl peroxide added to equal approximately twenty times the amount normally present (a "normal" amount of vulcanizing agent is approximately 0.2 part by weight of crystalline benzoyl peroxide per 100 parts silicone rubber solids) to vulcanize a single coating of the silicone rubber dispersion.

*Example 1*

In this example, a conductor 11 as shown in FIG. 1 is wound from a plurality of turns of copper straps having a covering of glass and Dacron filaments. Means, such as clips 13, are provided to maintain the conductor turns in a vertical stacked arrangement. A coat of silicone rubber is applied to the conductor such as by dipping the conductor into a silicone rubber dispersion by suitable means (not shown) for approximately thirty seconds. The time interval for the dipping step will vary slightly depending upon the concentration of the dispersion, the number of the coats to be applied, and whether or not the process is modified. However, it is preferred that each dip be at least five seconds and not exceed sixty seconds. The dipped conductor is allowed to drain for approximately five to ten minutes. The total draining time is determined as being the time required for the excess silicone rubber dispersion to cease dripping.

The coated conductor is next subjected to a step of dispelling the solvent. It is preferred to place the coated conductor in a circulating air oven or other similar heating device (not shown) and subjecting the coated conductor to forced air drying at a temperature sufficiently high to dispel the solvent, but below the temperature at which the vulcanizing agent will cause the silicone rubber elastic gum to be converted to its infusible stage. It is preferred that the drying temperature does not exceed 125° F. The drying time at 125° F. is variable depending primarily upon the air circulation capacity of the oven and may be stated as the time required to insure dispelling the solvent. It is important that substantially all traces of solvent be removed from each coat applied, otherwise, particularly in the coats applied subsequent to the first coat, the solvent absorbed by the previously applied coats will react with the vulcanization agent in the applied coats during the vulcanizing step and prevent vulcanization.

The cycle is repeated until a desired dielectric strength of the insulation is obtained. It was found, for example, that to provide a silicone rubber coating having ample safety factor, ten dips in a dispersion having twenty-seven percent silicone rubber solids by weight provided a dielectric strength suitable for commercial 440 volt application; fifteen dips provided a dielectric strength suitable for commercial 2300 volt application and twenty-two dips a dielectric strength suitable for commercial 4000 volt application. However, the number of dips will vary with the percent solids by weight of silicone rubber. It will be obvious to one skilled in the art that the concentration can be varied and the results observed by experimentation will determine the number of dips required.

It is also desirable to dip one-half of the total required dips while the conductor is suspended from one end, and the other half of the total dips while the conductor is suspended from the other end. As previously stated, to obtain dielectric strength of 440 volts requires ten dips. Five of these dips are to be applied while the conductor is suspended from one end, and the remaining five while the conductor is suspended from the other end. It is not important in what sequence the division of the dips are made provided one-half of the total dips will be made while the conductor is suspended from one end and the other half while the conductor is suspended from the other end. In FIG. 4, a cross sectional view of a conductor prepared according to this method shows a homogeneous layer 14 of insulation comprising a plurality of individually applied coats that have bonded together and cannot be distinguished from each other.

After all coats are applied, the conductor is ready for the vulcanizing step previously described. It was found advantageous to subject the coated conductor to a temperature substantially in excess of the temperature required by the vulcanizing agent to convert the rubber to the infusible stage and for a time substantially in excess of time required for the conversion. The possibility of having the reaction reverse itself is thereby eliminated.

*Example 2*

Example 1 is modified by incorporating a step of wrapping the conductor with a silicone rubber tape. In this example, at least one coat of silicone rubber dispersion is applied to the conductor. To apply each coat, the conductor is subjected to the dipping and solvent dispelling cycle described in Example 1.

The solvent-free silicone rubber coated conductor is then vulcanized. The vulcanizing step described in Example 1 may be utilized, but being an intermediate step in this example, an application of heat between 275° F. to 300° F. for one hour is adequate at this point. It is only necessary to subject the coated conductor to a temperature at which the vulcanizing agent will cause the silicone rubber gum to be substantially converted to the infusible stage and for a time necessary to perform the conversion. The vulcanized silicone rubber coated conductor is then wrapped with a silicone rubber tape. The tape wrapping step is followed by at least one additional coating cycle to form a smooth exterior surface. The completed conductor is then subjected to a final vulcanizing step as described for Example 1.

*Example 3*

In this example, the deposit rate of silicone rubber is greatly increased by a series of tape wrapping and coating cycles. As in Example 2, at least one coat of silicone rubber elastic gum is applied by the usual dipping and solvent dispelling steps. The solvent-free silicone rubber elastic gum coated conductor is then wrapped with a silicone rubber tape and at least one coating cycle is repeated followed by an additional tape wrapping cycle. These steps are repeated until a coating having a desired dielectric strength is reached. The final application of silicone rubber in this example comprises two dipped coats of silicone rubber elastic gum to provide a smooth outer coat.

A critical factor exists in dipping subsequent to the application of silicone rubber tape. Extended immersion of the tape coated conductor tends to loosen and weaken the wound tape. This is due to the inherent tendency of silicone rubber to readily absorb an excesve amount of solvent. The dip, therefore, must be rapid and is preferably in the order of five seconds.

In this example the coated and wrapped conductor is not subjected to a vulcanizing step until the applied silicone rubber reaches the desired dielectric strength. The coated and wrapped conductor is then subjected to the final step of vulcanization according to Example 1.

FIG. 5 illustrates a conductor prepared according to this method and shows dipped layers 15 and tape layers 16. However, FIG. 5 is merely exemplary of this method and in practice, the final product cannot be distinguished from FIG. 4.

*Example 4*

Example 1 is modified by incorporating a step of wrapping the conductor with a loosely woven temperature resistant material such as a porous polyester mat or a woven glass tape prior to the final dip coats to increase the structural strength of the insulating wall. The final dip coats are then applied to the coats. The conductor is then subjected to two dipping cycles and followed by the vulcanizing step described in Example 1.

As shown in FIG. 6, a protective material 17 is wrapped around the conductor 20 being disposed between the bonded dip coats 15 of silicone rubber.

*Example 5*

This example is essentially a combination of prior examples. The conductor is coated with two coats of silicone rubber elastic gum, each coat comprising the steps of dipping and solvent dispelling. The conductor having two coats of solvent free silicone rubber elastic gum thereon is then subjected to a vulcanizing step as described in Example 1. The vulcanized silicone rubber covered conductor is then wrapped with a silicone rubber tape followed by a wrapping of loosely woven glass fiber tape. The conductor is then subjected to two additional coating cycles followed by a final vulcanizing step.

A conductor having thereon insulation applied according to Example 5 is suitable for commercial use according to the total minimum insulation buildup. The following are examples of the dielectric strength of various thicknesses of insulation.

| Total minimum insulation buildup, inch: | Voltage rating (maximum), volts |
|---|---|
| .090 | 500 |
| .100 | 1500 |
| .120 | 3000 |
| .150 | 4800 |

While dipping is recited as the mode of applying the silicone rubber dispersion, other coating means may be employed, for example, such as spraying, flowing, or brushing. The dipping method is preferred because of its lower cost, simplicity of apparatus, and simultaneously uniform distribution.

It is also understood that the above examples are merely exemplary and are not intended to be limitations.

Having now particularly described and ascertained the nature of our said invention and the manner in which it is to be performed, we declare that what we claim is:

1. A method of applying an integrally bonded solid homogeneous silicone rubber covering to an article comprising the steps of: (1) coating said article with a silicone rubber elastic gum dispersed in a volatile organic solvent having dissolved therein a vulcanizing agent; (2) dispelling substantially all solvent from said applied coat by subjecting said coated article to a temperature for a period of time necessary to do so but with said dispelling temperature always being substantially below the temperature above which said vulcanizing agent causes said silicone rubber elastic gum to convert to an infusible stage; (3) repeating the cycle of steps 1 and 2 at least one more time; and then (4) vulcanizing said silicone rubber elastic gum by subjecting said coated article to a temperature at which said vulcanizing agent causes said silicone rubber elastic gum to be converted to the infusible stage.

2. A method for manufacturing a silicone rubber covered conductor, the steps comprising: (1) applying to said conductor a coating of silicone rubber elastic gum dispersed in a volatile solvent, said dispersion including a solvent soluble vulcanizing agent added in substantial excess of the amount required to vulcanize a single applied coat of silicone rubber elastic gum; (2) dispelling remaining solvent by subjecting said coated conductor to an application of heat for a time necessary to do so and at a temperature substantially below the temperature at which said vulcanizing agent causes said silicone rubber elastic gum to be converted to the infusible stage; (3) then repeat the cycle of steps 1 and 2 at least once; (4) then subjecting said coated conductor to a temperature at which said vulcanizing agent causes said silicone rubber elastic gum to be converted to the infusible stage and for a period of time necessary to do so; (5) then wrapping said vulcanized silicone rubber coated conductor with silicone rubber tape; (6) then repeat the cycle of steps 1 and 2 at least twice; (7) then repeat step 4.

3. A method for manufacturing a silicone rubber covered conductor, the steps comprising: (1) applying to said conductor a coating of silicone rubber elastic gum dispersed in a volatile solvent, said dispersion including a solvent soluble vulcanizing agent added in substantial excess of the amount required to vulcanize a single applied coat of silicone rubber elastic gum; (2) dispelling remaining solvent by subjecting said coated conductor to an application of heat for a time necessary to do so and at a temperature substantially below the temperature at which vulcanizing agent causes said silicone rubber elastic gum to be converted to the infusible stage; (3) then repeat the cycle of steps 1 and 2 at least once; (4) then subjecting said coated conductor to a temperature at which said vulcanizing agent causes said silicone rubber elastic gum to be converted to the infusible stage and for a period of time necessary to do so; (5) then wrapping said vulcanized silicone rubber coated conductor with silicone rubber tape; (6) then repeat the cycle of steps 1 and 2 at least once; (7) then wrapping said conductor with a loosely woven temperature resistant tape; (8) then repeating steps 1 and 2 at least once; (9) then repeat step 4.

4. The method recited in claim 1 wherein said silicone rubber solution dispersion comprises approximately twenty to thirty weight percent of silicone rubber solids including silicone rubber elastic gum dispersed in a volatile solvent, and a vulcanizing agent soluble in said solvent and equal to approximately twenty times the amount that is required to vulcanize the first applied coating of said silicone rubber elastic gum.

5. A method for manufacturing a formed silicone rubber insulated coil, the steps comprising: (1) forming a coil from an insulated conductor; (2) applying means to maintain said coil in a stacked condition; (3) applying to said coil a coating of silicone rubber elastic gum dispersed in a volatile solvent, said dispersion including a solvent soluble vulcanizing agent added equal to a substantial excess of the amount that is required to vulcanize a single applied coat of silicone rubber elastic gum; (4) dispelling remaining solvent by subjecting said coated coil to an application of heat for a period of time necessary to do so and at a temperature sufficiently high to vaporize the solvent, said temperature being substantially below the temperature at which said vulcanizing agent causes said silicone rubber elastic gum to be converted to the infusible stage; (5) removing means maintaining said coil in a stacked condition; (6) then repeating the cycle of steps 3 and 4 at least once; (7) then subjecting said coated coil to a temperature at which said vulcanizing agent causes said silicone rubber elastic gum to be converted to the infusible stage; (8) wrapping said vulcanized silicone rubber coated coil with a silicone rubber tape; (9) then repeating the cycle of steps 3 and 4; (10) then repeat step 7; (11) then wrapping said coil with a loosely woven temperature resistant protective tape; (12) then repeating the cycle of steps 3 and 4 at least once; and (13) repeat step 7.

6. A method of producing a formed consolidated reinforced silicone rubber insulated coil from a lightly insulated conductor, the steps comprising: (1) forming a plurality of loose turns from said lightly insulated conductor; (2) attaching clipping means to said coil to maintain said plurality of turns in a stacked arrangement; (3) applying to said stacked turns a coating of silicone rubber elastic gum dispersed in a volatile solvent, said dispersion including a vulcanizing agent added equal to a substantial excess of the amount that is required to vulcanize a single applied coat; (4) draining said coated turns to remove excess silicone rubber dispersion; (5) dispelling the solvent from said applied coat of silicone rubber by subjecting said coated turns to an application of heat for a period of time necessary to do so and at a temperature substantially below the temperature at which said vulcanizing agent causes said silicone rubber elastic gum to be converted to the infusible stage; (6) removing said clipping means from said stacked silicone rubber coated turns; (7) repeating the cycle of steps 3 through 5 at least once; (8) vulcanizing said solvent free adhered silicone rubber coat; (9) wrapping said vulcanized silicone rubber coated coil with loosely woven temperature resistant tape; (10) repeating the cycle of steps 3 through 5 at least twice; and (11) repeat step 8.

7. A method of producing a formed consolidated insulated coil from a lightly insulated conductor, the steps comprising: (1) winding said lightly insulated conductor into a plurality of loose turns; (2) providing means maintaining said plurality of turns in a stacked arrangement; (3) applying to said turns a coat of silicone rubber elastic gum dispersed in a volatile solvent having dissolved therein a vulcanizing agent, the percentage of said vulcanizing agent being equal to at least twenty times the amount that is required to cause the single applied coat of silicone rubber elastic gum to be converted to the infusible stage but below the amount that causes foaming during vulcanization; (4) dispelling solvent from said applied coat of silicone rubber by subjecting said coated turns to an application of heat for a period of time necessary to do so and at a temperature substantially below the temperature at which said vulcanizing agent causes said silicone rubber elastic gum to be converted to the infusible stage; (5) removing said means utilized to maintain said turns in a stacked arrangement; (6) repeat steps 3 and 4 until the deposited silicone rubber possesses a desired dielectric strength; and then, in any sequence, the steps of (7) forming said turns into a formed coil; and (8) subjecting said silicone rubber elastic gum to a temperature above the temperature at which said vulcanizing agent causes said silicone rubber elastic gum to be converted to the infusible stage.

8. A method of producing a formed consolidated reinforced silicone rubber insulated coil from a lightly insulated conductor, the steps comprising: (1) providing a formed coil having a plurality of lightly insulated conductor turns; (2) providing means to maintain said coil in a stacked arrangement; (3) applying to said coil a coating of silicone rubber elastic gum dispersed in a volatile solvent having dissolved therein a vulcanizing agent added in excess of the amount that is required to vulcanize the single applied coat; (4) dispelling solvent from said applied coat of silicone rubber by subjecting said coated turns to an application of heat for a period of time necessary to do so at a temperature substantially below the temperature at which said vulcanizing agent causes said silicone rubber elastic gum to be converted to the infusible stage; (5) removing said means maintaining said plurality of turns of said coil in a stacked arrangement; (6) repeating the cycle of steps 2 through 4 at least once; (7) wrapping said silicone rubber coated conductor with a porous loosely woven temperature resistant material; (8) repeating the cycle of steps 3 through 5 at least twice; and (9) vulcanizing said solvent-free silicone rubber.

9. A method of producing a reinforced silicone rubber insulated coil comprising the steps of: (1) providing a coil formed from a lightly insulated conductor; (2) applying to said coil a coating of silicone rubber elastic gum dispersed in volatile solvent having dissolved therein a vulcanizing agent soluble in said solvent and added in excess of the amount required to cause the single coat of silicone rubber elastic gum to be converted to the infusible stage; (3) dispelling the solvent from said applied coat by subjecting said coated turns to an application of heat for a period of time necessary to do so at a temperature substantially below the temperature at which said vulcanizing agent causes said silicone rubber elastic gum to be converted to the infusible stage; (4) repeat the cycle of steps 2 and 3 at least once; (5) subject said silicone rubber elastic gum to a temperature at which said vulcanizing agent causes said silicone rubber elastic gum to be converted to its infusible stage; (6) wrapping said coil with a silicone rubber tape; (7) wrapping said coil with an open weave glass reinforcing tape; (8) then repeat the cycle of steps 2 and 3 at least once; (9) repeat step 5.

References Cited in the file of this patent

UNITED STATES PATENTS

| 2,494,920 | Warrick | Jan. 17, 1950 |
| 2,922,734 | Kohn et al. | Jan. 26, 1960 |